United States Patent
Santacatterina et al.

[19]

[11] Patent Number: 6,056,000
[45] Date of Patent: May 2, 2000

[54] CONTROL SYSTEM FOR PULSE WIDTH MODULATION-OPERATED SOLENOID VALVES

[75] Inventors: Giampiero Santacatterina, Sangiano; Daniele Franchi, Bodio Lomnago, both of Italy

[73] Assignee: Whirlpool Corporation, Benton Harbor, Mich.

[21] Appl. No.: 08/999,365

[22] Filed: Dec. 29, 1997

[30] Foreign Application Priority Data

Dec. 30, 1996 [IT] Italy .................................. M196A2761

[51] Int. Cl.$^7$ .................................................. F16K 31/02
[52] U.S. Cl. ............................ 137/1; 251/129.01; 251/64
[58] Field of Search ..................... 251/129.01, 129.15, 251/64, 129.05; 361/160, 194; 137/1

[56] References Cited

U.S. PATENT DOCUMENTS 4,726,389  2/1988  Minoura et al. ............... 251/129.05 X
5,749,388  5/1998  Elliott et al. ........................... 251/64 X

FOREIGN PATENT DOCUMENTS

| 04030403 | 2/1992 | European Pat. Off. . |
| 19600351 | 7/1997 | Germany . |
| 0791943 | 8/1997 | Germany . |
| 57-072306 | 5/1982 | Japan . |
| 5381297 | 1/1995 | U.S. . |

OTHER PUBLICATIONS

European Search report 97 11 6582.

*Primary Examiner*—Kevin Lee
*Attorney, Agent, or Firm*—Joel M. Van Winkle; Robert O. Rice; Thomas J. Roth

[57] ABSTRACT

With the system the movement a solenoid valve valving member is damped both during opening and during closure by delaying pulses applied during the movement of the valve mobile member, to reduce end-of-travel impact both during opening and during closure, and to reduce vibration and noise.

5 Claims, 2 Drawing Sheets

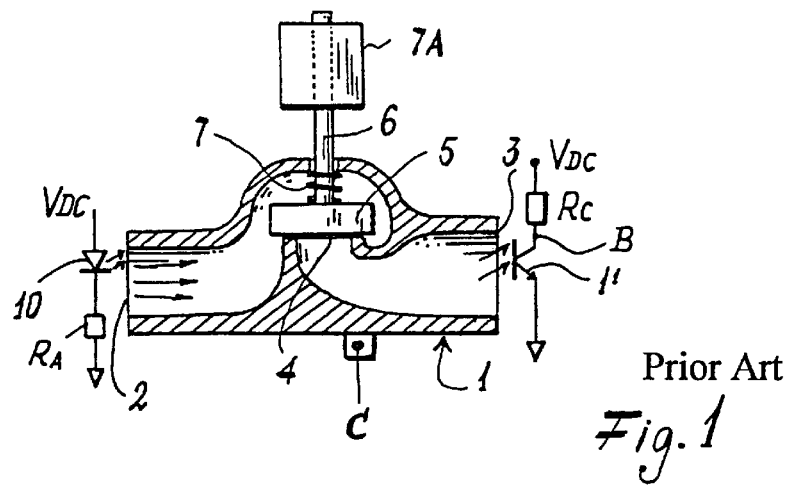
Prior Art
Fig. 1
Prior Art
Fig. 2
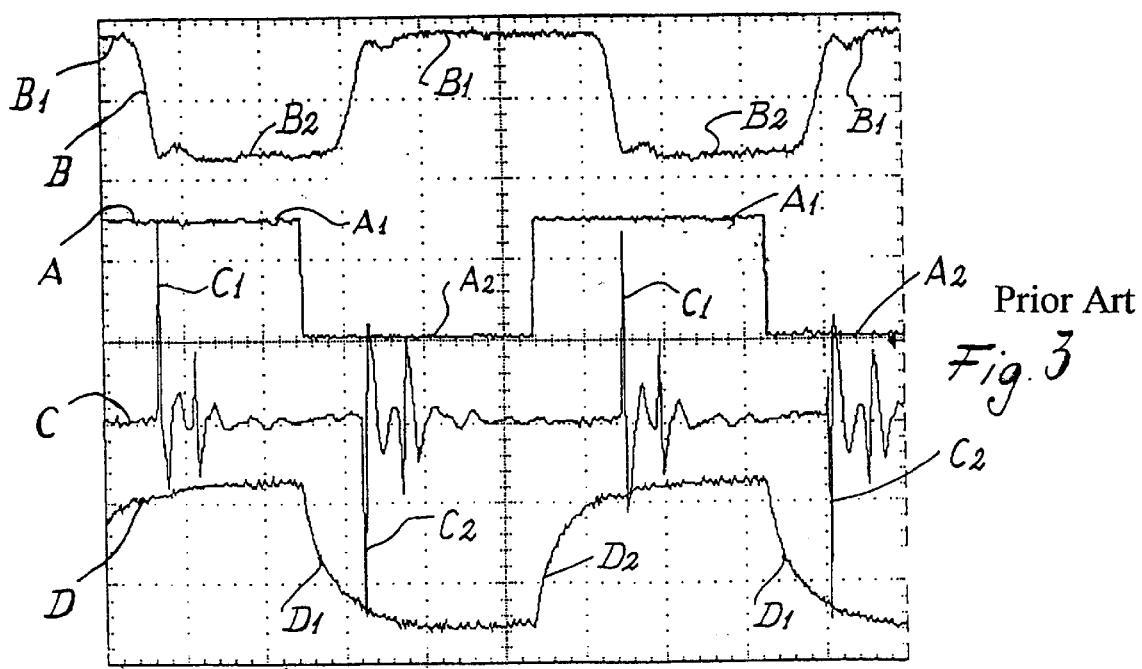
Prior Art
Fig. 3 and description of a preferred embodiment thereof given here-

CONTROL SYSTEM FOR PULSE WIDTH MODULATION-OPERATED SOLENOID VALVES

BACKGROUND OF THE INVENTION

Field of the Invention

This invention relates to a control system for pulse width modulation-operated (PWM signals) solenoid valves comprising a seal seat, a valving or sealing member, elastic means operating on said valving member to tend to maintain said member on the seal seat, and a solenoid which, when energized, withdraws the valving member from the seal seat against the action of the elastic means.

The system is of the type in which the valve opening pulses are provided by a microcontroller or the like, which amplitude-modulates the width of said pulses on the basis of the user-set flow rate of the fluid (generally fuel gas) passing through the valve.

At that end intended to cooperate with the seal seat, the sealing member comprises an elastomer part. When the solenoid is de-energized, the spring violently urges the sealing member against the relative seat. During this stage the elastomer part hence absorbs all the kinetic energy possessed by the relative sealing member following the thrust of the spring, the impact against the seal seat being such as to produce permanent deformation of the elastomer material with the passage of time, so limiting the useful life of the solenoid valve, especially when frequent switching is necessary, as in the case of control by PWM signals.

Description of the Related Art

Italian patent application MI95A001856 filed on Jan. 9, 1995 in the name of the present applicant describes a system for remedying this problem. According to this known system a force counteracting the spring is applied to the valving member when moving towards the seal seat, to reduce the impact energy between the relative sealing member and the relative seat. According to this known system, a feedback circuit is provided which carries the information relative to the start of the actuator movement to a microprocessor to operate the braking force.

This known system eliminates (or reduces) the effect of the impact against the seat, but includes the use of a suitable feedback circuit. However it does not also allow the valving member to be damped during the opening stage, with consequent annoying noise when this member collides on termination of opening, together with vibration and hence noise induced in the structures connected to the valve, and lack of perfect linearization of flow control (ie the flow does not increase linearly with increased duty cycle).

SUMMARY OF THE INVENTION

An object of the present invention is to provide a system which not only enables the results obtained with the known solution to be improved, but also enables new results to be achieved by on the one hand eliminating noise and vibration during both opening and closure, and on the other hand achieving perfect flow linearization.

This and further objects which will be more apparent from the detailed description given hereinafter are attained by a system in accordance with the accompanying claims.

BRIEF DESCRIPTION OF THE DRAWINGS

The invention will be more apparent from the detailed description of a preferred embodiment thereof given hereinafter by way of non-limiting example with reference to the accompanying drawing, in which:

FIG. 1 is a schematic section through a known solenoid valve to which, by way of example, there are applied means for determining end-of-travel impacts of the valving member, and fluid flow measurement means;

FIG. 2 shows the valve control circuit;

FIG. 3 shows the variation with time of the signals at specific points indicated in the preceding figures, relative to the control of the valve by conventional means;

DESCRIPTION OF THE PREFERRED EMBODIMENT

Figure 4:
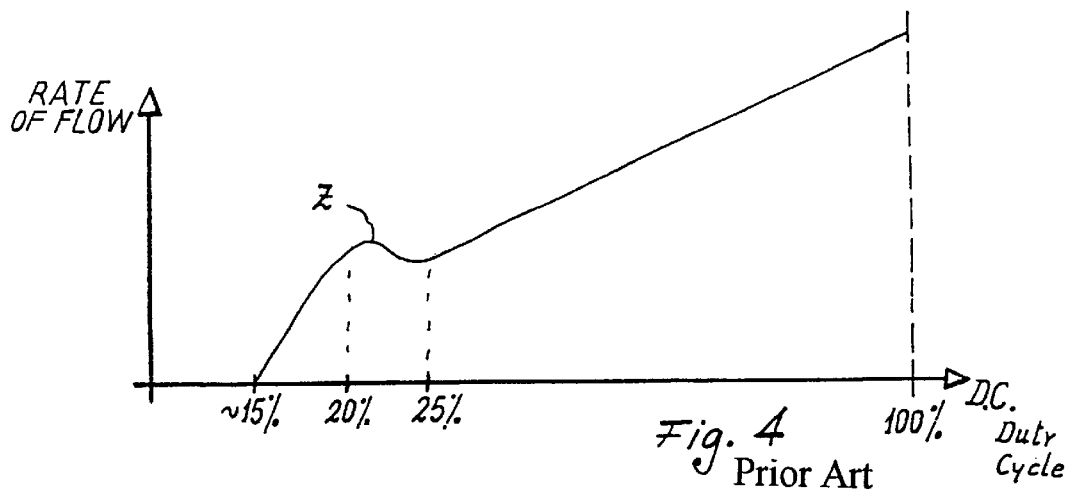
FIG. 4 shows the flow variation as a function of the duty cycle of a conventionally controlled valve.

The valves to which the invention relates, one of which is shown schematically in FIG. 1, are two-state shutoff valves (open/closed). They comprise (FIG. 1) a body 1 provided with an inlet 2 and an outlet 3. In the body 1 there is provided a seal seat 4 to be closed by a sealing member 5 of elastomer material or the like.

The member 5 is rigid with a moving core 6 (the two forming the valve moving member), on it there acting in one direction a return spring 7 for urging it against the seal seat 4 to obtain the normally "closed" state of the valve when at rest. The moving core 6 is mounted slidable within a stationary solenoid or coil 7A, which when energized causes the sealing member 5 to withdraw against the action of the spring, to achieve the valve "open" state in operation. The coil or solenoid of the solenoid valve is connected (FIG. 2) to a d.c. voltage source $V_{DC}$ in series with a static switch 8 represented by way of example as a transistor with its emitter connected to earth. The base of the transistor 8 is connected via a resistor $R_B$ to a microprocessor nP which on the basis of input signals which reach it via one or more lines K controls the transistor 8 and hence the valve with PWM (pulse width modulated) signals, the duty cycle of which depends on the signal or signals originating from the line or lines K.

By way of example, the signals along the lines K can relate to the position of a knob (not shown) which the user operates to vary the flow of gas through the valve towards a conventional burner of a gas hob or cooker.

To verify the operational behaviour of the valve the following laboratory devices are for example used:

a) an accelerometer C positioned in contact with the body 1 of the solenoid valve;

b) an infrared emitting diode 10 connected to a d.c. voltage source $V_{DC}$ and in series with a resistor $R_A$. The emitter diode is positioned within the valve inlet duct, even if on the drawing it is shown outside for simplicity of representation.

c) an infrared receiver device 11 connected to the source $V_{DC}$ via a resistor $R_C$.

The receiver device 11 is positioned within the valve outlet duct, even if on the drawing it is shown outside for simplicity of representation.

Signals are taken from the points A and D of the circuit of FIG. 2. Other signals are taken (FIG. 1) from the accelerometer C and from the point B of the circuit of the infrared receiver device.

For the conventional solenoid valve control system, these four signals are shown as a function of time in FIG. 3 and are identified by the same reference letters. Specifically, the signal B is inversely proportional to the valve opening; in this respect when the valve is open there is maximum passage of infrared radiation through the valve so that the impedance of the receiver device 11 is low, as is the signal B. The signal B is instead high with the valve closed, when no infrared radiation reaches the receiver device 11. The portions B1 and B2 of the curve B represent the closed state and the open state respectively. The signal A represents the PWM signal (width modulated signal) applied to the static switch 8 and is hence the signal for operating the valve (or its coil). When it is high (portions A1) the static switch conducts and hence the coil 7A is energized, with consequent opening of the solenoid valve, which is maintained in this state (in this respect it should be noted that the valve requires a certain time, even though very short, to move from one state to the other). When it is low (portions A2) the static switch is inhibited, the coil 7A is de-energized and the valve moves to its closed state, which it maintains until the new pulse A1. The signal C is that obtained from the accelerometer, which measures the "acceleration" generated by the end-of-travel impact both of opening and of closure of the valve moving member (5+6).

From an examination of the signal C two facts emerge. The first is that there are considerable peaks at the valve opening end-of-travel points (peaks indicated by C1) and closure end-of-travel points (peaks indicated by C2), these peaks signifying impact of the valve moving member (5+6) against the seal seat 4 or against the body 1 via the compressed spring 7. Moreover, the succession of decreasing peaks of lesser intensity, which follow said closure and opening peaks, indicate that there are substantial vibrations. The impacts or vibrations are indicative of the noise of the valve and of the structures connected thereto.

The curve D shows the signal variation at the static switch 8. The portions D1 and D2 represent this variation during valve closure and opening respectively, the remaining portions indicating the signal with the valve open and closed. In other words the portions D1 and D2 represent the de-energized and energized state of the coil.

Moreover, flow measurements (values plotted on the vertical axis against the duty cycle expressed as a percentage) show that with the valve controlled by the known system the non-linear curve reproduced in FIG. 4 is obtained, from which it can be seen that at low duty cycle percentages (up to about 25%), the flow rate is not linear and has a relative maximum at Z. This means that if the valve is used to regulate the gas flow to a burner, its flame cannot be regulated with the required precision, especially at low thermal powers.

According to the system of the invention, aimed at considerably reducing noise, vibration and non-linearity of the flow as a function of the duty cycle, the opening and closure stages of the solenoid valve, ie the movement of the relative mobile member (5+6), are modulated in a certain sense by controlling its coil or solenoid by suitable braking action.

During the valve closure stage, a succession or train of pulses results in active interventions of the coil or solenoid 7A such as to oppose the action of the return spring 7, whereas during the opening stage, in which the coil 7A is energized, this train or succession of pulses are in a sense "off-cut" from the high PWM signal; with the intervals between one pulse and the next, this pulse train or succession results in a reduction in the attraction force of the coil or solenoid, hence enabling the spring 7 to exert a greater counteracting and hence braking action.

Figure 5:
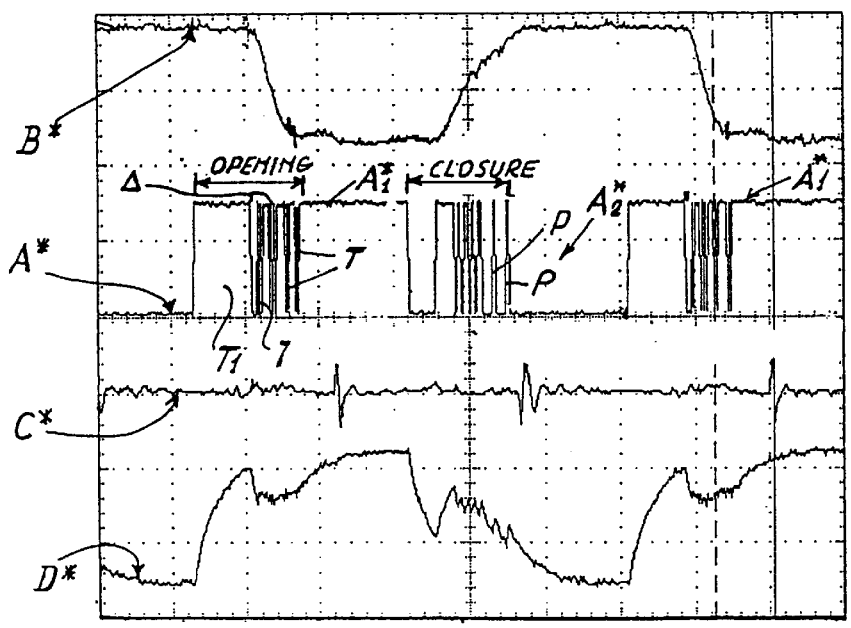
FIG. 5 shows the variation with time of the same signals as FIG. 3 but relative to the control system according to the invention.

The a foregoing is further clarified hereinafter with reference to FIGS. 5 and 6. Specifically, the curves of FIG. 5 represent the signals as a function of time, obtained at the points A, B, C, D of FIGS. 1 and 2, but using the control system of the invention. In FIG. 5 these signals are identified by the same letters but with the addition of an asterisk (ie A*, B*, C*, D*) to distinguish them from the signals obtained at the same points with the traditional control system shown in FIG. 3.

From a Comparison of FIGS. 3 and 5 the Following an be seen:

a) that the signal B* substantially coincides with the signal B, except for damping effects, with which slight variations in the rising and falling fronts of the signal are associated;

b) that the signals A and A* are completely different.

When the signal A* is high ($A_1$*) it is composed of two separate parts, namely a valve "OPENING" part followed by a valve "OPEN" part.

In the "OPENING" part the signal comprises or is formed from a succession or train of pulses T (which can be of equal or different duration) off-cut from the high PWM signal. In this example the initial pulse T1 preferably has a longer duration than the subsequent pulses T, which can be equal. In the case of the traditional signal B there is no difference between the two parts, it being totally high, signifying that the coil 7A is always maximumly active when this signal is present. The invention therefore reduces the motor effect of the coil 7A by the pulse train or succession, which with the intervals A between the individual pulses T determines moments of absence of the signal controlling the static switch 8, and hence in practice moments of absence of power to the coil 7A. The result is that in these moments the coil action is more greatly counteracted by the spring 7, and an action arises which brakes the motion of the moving member (5+6) of the valve and, as demonstrated by the absence of peaks and oscillations in the accelerometric signal C*, the absence of impact or noise when the valve opens.

With passage of the PWM signal from the high state to the low state A*, the valve "closure" plus closed stage begins. In the traditional solution, this stage is defined by the portions $A_2$ which are substantially flat. However, in the solution of the invention, this stage ($A_2$*) is divided into two parts, namely a valve "CLOSURE" part followed by a flat valve closed part.

The "CLOSURE" part is identified by a succession or train of pulses P (equal or different in duration) which operate in such a sense as to energize the coil 7A so that this counteracts the closure action which the spring 7 exerts on the valve. As demonstrated by the accelerometric signal C*, vibration (source of noise) is also decidedly reduced during the closure stage compared with the traditional solution of FIG. 3.

The signal D* differs considerably from the signal D by the modulation introduced by the pulse trains T and P (both imposed and off-cut).

Figure 6:
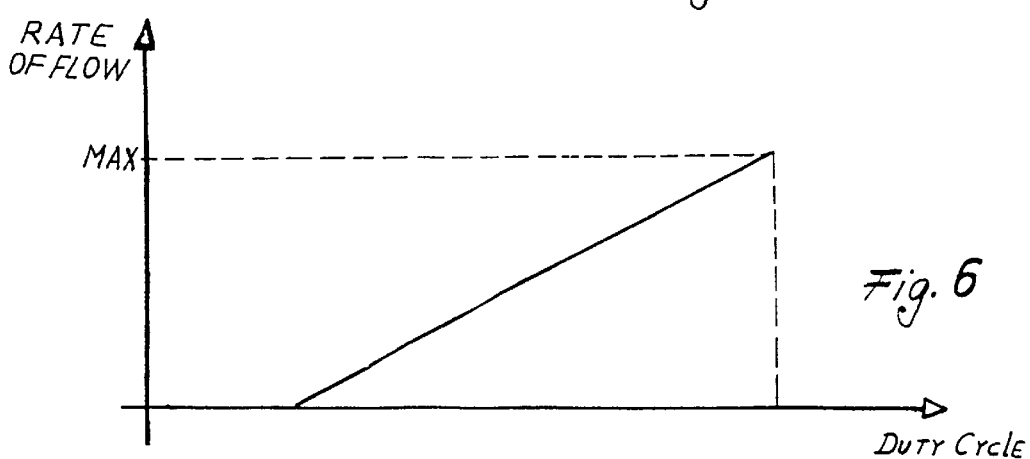
FIG. 6 shows the flow variation as a function of the duty cycle of a valve controlled by the system of the invention.

By comparing FIGS. 4 and 6 it can also be seen that with the invention the valve throughput is a linear function of the duty cycle instead of non-linear as within the range between 20% and 25% of the duty cycle of the traditional system.

The pulse trains and their format are provided by the microprocessor nP implemented on the basis of experimental data obtained for each type of valve, for example, for a given value of the duty cycle.

It is evident that the static switch can be controlled such that the variation in the current passing through the coil is the same as that shown at D* of FIG. 5, ie in "analog" mode.

It is also evident that an embodiment in which the spring opens the valve and the coil closes it also falls within the scope of the invention.

We claim:

1. A control system for a solenoid valve for use in a cooking appliance which includes a microprocessor for generating a plurality of pulse width modulation signals (PWM signals) for operating the solenoid valve, wherein the improvement comprises:

means for braking the closure of the solenoid valve including a solenoid coil for generating an attraction force by imposing a train or succession of pulses on the PWM signals fed to the solenoid valve by the microprocessor, such that the attraction force of the solenoid coil is reduced wherein the opening of the solenoid valve is braked.

2. A system as claimed in claim 1, further wherein at each high state of the PWM signals the solenoid valve opens during a first stage and is maintained open during a second stage, and wherein at each low state of the PWM signals the solenoid valve closes during a first stage and is maintained closed, and wherein during the first stage in which the valve opens, the train or succession of pulses is applied on the high PWM signal, the time intervals between one pulse and the next of this train or succession bringing the PWM signal to the low state for the duration of said intervals so braking the opening of the valve, another pulse train or succession of pulses being superposed on the low state of the PWM signal during the first stage in which the valve closes, so braking the closure of the valve.

3. A system as claimed in claim 1, wherein the improvement further comprises:

a static switch connected in series with the solenoid coil wherein the PWM signals and pulse trains are provided by the microprocessor and applied to the static switch.

4. A method of controlling the operation of a pulse width modulation-operated (PWM signals) solenoid valve for using in a cooking appliance, the solenoid valve having a solenoid coil for generating an attraction force, the method comprising the steps of:

imposing a train or succession of pulses on the PWM signals fed to the solenoid valve by a microprocessor, and reducing the attraction force of the solenoid coil wherein the opening of the solenoid valve is braked.

5. The method of controlling the operation of a pulse width modulation-operated (PWM signals) solenoid valve according to claim 4, the method further comprising the steps of:

opening the solenoid valve during each high state of the PWM signal during a first stage;

maintaining the solenoid valve open during a second stage, closing the solenoid valve during each low state of the PWM signal during a first stage and maintaining the solenoid closed;

braking the solenoid during the first stage in which the valve opens by applying the train or succession of pulses on the high PWM signal such that during the time intervals between one pulse and the next of this train or succession the PWM signal is brought to the low state for the duration of said intervals thereby braking the opening of the valve, braking the closure of the solenoid valve by superimposing the train or succession of pulses on the low state of the PWM signal during the first stage in which the valve closes.

* * * * *